United States Patent [19]

Hedberg

[11] E Re. 31,544

[45] Reissued Mar. 27, 1984

[54] CURRENT UNIT FOR ARC WELDING

[75] Inventor: John B. G. Hedberg, Hanover, N.H.

[73] Assignee: Thermal Dynamics Corporation, West Labanon, N.H.

[21] Appl. No.: 188,785

[22] Filed: Sep. 19, 1980

Related U.S. Patent Documents

Reissue of:

[64] Patent No.: 4,159,409
Issued: Jun. 26, 1979
Appl. No.: 891,821
Filed: Mar. 30, 1978

U.S. Applications:

[62] Division of Ser. No. 795,501, May 10, 1977, abandoned.

[30] Foreign Application Priority Data

May 12, 1976 [GB] United Kingdom ..... 19532/76

[51] Int. Cl.[3] ..... B23K 9/10

[52] U.S. Cl. ..... 219/130.21

[58] Field of Search ..... 219/130.1, 130.21, 130.31, 219/130.33, 130.51

[56] References Cited

U.S. PATENT DOCUMENTS

| | | | |
|---|---|---|---|
| 3,330,933 | 7/1967 | Maklary | 219/130.51 |
| 3,382,345 | 5/1968 | Normando | 219/130.51 |
| 3,684,942 | 8/1972 | Petit, Jr. et al. | 219/130.21 |
| 3,728,516 | 4/1973 | Daspit | 219/130.33 |
| 3,894,210 | 7/1975 | Smith et al. | 219/130.51 |
| 3,895,212 | 7/1975 | Maxwell et al. | 219/130.33 |

FOREIGN PATENT DOCUMENTS

| | | |
|---|---|---|
| 2547138 | 4/1976 | Fed. Rep. of Germany . |
| 38-18085 | 9/1963 | Japan . |

*Primary Examiner*—C. C. Shaw
*Attorney, Agent, or Firm*—Sughrue, Mion, Zinn, Macpeak & Seas

[57] ABSTRACT

An a.c. operated arc welding current supply unit comprises a frequency converter of the series capacitor type and operating with a half period which is substantially less than the average duration of the current and voltage transients caused by short circuits through droplets of weld material during welding. The frequency converter is connected to welding electrodes through a transformer in series with a rectifier to provide direct current for the welding electrodes, and the frequency converter is associated with a control device for controlling the operating frequency of the converter in a manner such that it is substantially inversely proportional to the square of the input voltage of the current supply unit, thereby maintaining the power output of said unit substantially unchanged irrespective of changes in load caused by the welding operation and irrespective of variations in said input voltage.

10 Claims, 3 Drawing Figures

CURRENT UNIT FOR ARC WELDING

Matter enclosed in heavy brackets [ ] appears in the original patent but forms no part of this reissue specification; matter printed in italics indicates the additions made by reissue.

This is a divisional application of Ser. No. 795,501, filed May 10, 1977, now abandoned.

The present invention relates to an arc welding current supply unit which is arranged to be fed with alternating current and to provide direct current for welding electrodes.

An object of the invention is to provide a novel and useful welding current supply unit which will facilitate welding operations so that an acceptable weld can be made by relatively unskilled persons and which will also enable more satisfactory welding operations to be carried out than was hitherto possible, with the use of conventional welding current units operating at main frequencies.

To this end it is suggested in accordance with the invention that an arc welding current supply unit of the aforementioned type includes a controlled frequency converter operating with a half-period which is less than the average duration of the current and voltage transients caused by short circuits through droplets of the weld material, e.g. less than 3 milliseconds, and prefeably less than 1.5 milliseconds, and adapted to be connected to the welding electrodes through a transformer in series with a rectifier, and also includes a control device which is adapted to control the converter in a manner such that the arc power remains substantially unchanged irrespective of changes in load caused by the welding operation, wherein said converter is of the series-capacitor type converter, i.e. the primary winding of the transformer is supplied from a d.c. voltage intermediate stage by controlled alternating *charge and* discharge of one or more capacitors connected in series with said primary winding, and wherein the voltage of the a.c. supply applied to the unit is substantially constant, the control device may be adapted to control the converter in a manner such that it operates at a constant frequency which can be adjusted to a desired value. On the other hand, the control device is arranged to control the operating frequency of the converter so that it is substantially inversely proportional to the square of the voltage of the a.c. supply or the voltage applied to the capacitor or capacitors.

With such a welding current supply unit there is obtained a paticularly stable and quiescent arc, irrespective of small variations in the distance between electrode and work piece. In addition, in the event of a short circuit caused by droplets of welding material, the arc will be smoothly re-ignited with small dynamic effect on the molten material.

So that the invention will be more readily understood and optional features thereof made apparent, an embodiment thereof will now be described with reference to the accompanying schematic drawings, in which.

Figure 1:
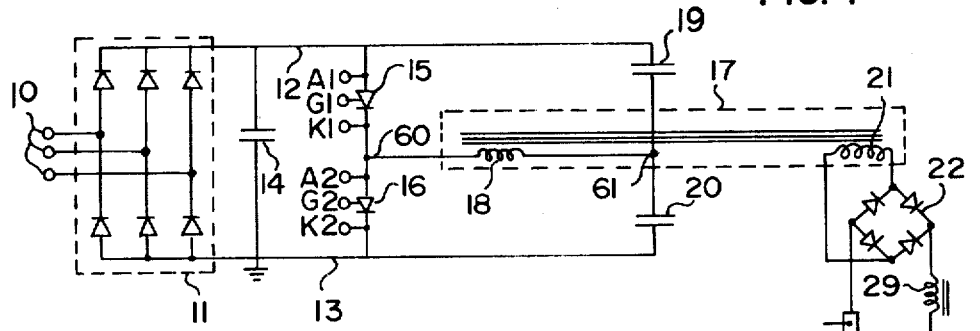
FIG. 1 is a circuit diagram of an a.c. operated arc welding current supply unit having a frequency converter of a type which can be used to advantage in conjunction with the present invention.

The current supply unit shown in FIG. 1 is connected at 10 to a 3-phase a.c. network. The input current is rectified in a six-element full-wave rectifier 11, the rectified output voltage on lines 12, 13 being smoothed by a buffer capacitor 14 and applied to a frequency converter having—as a consequence of the shown arrangement of elements 11 to 14—a low input impedance.

With the illustrated embodiment the switching elements of the frequency converter comprise thyristors 15, 16 which are controlled so as to be altenately energized. The frequency converter is associated with a transformer generally shown at 17 and the primary winding 18 of which is connected in series with load capacitors 19, 20 forming parts of the frequency converter. The secondary winding 21 of the transformer 17 is connected via a bridge rectifier 22 and a choke 29 to welding electrode terminals 24, 25, which terminals are capable of being connected to a winding electrode holder and a work piece to be welded. With the illustrated embodiment there is connected between the terminals 24, 25 a capacitor 26 which is used to maintain a desired open-circuit voltage. A shunt 27 may also be arranged for measuring the load current.

In the case of a fluctuating supply voltage and a constant converter frequency the desired converter provides a power output which varies substantially proportionally to the square of the supply voltage $U_{10}$ between the terminals 10. If the power output from the current unit is to remain substantially constant irrespective of fluctuations in the supply voltage, the frequency of the converter must be varied in proportion to $1/U_{10}^2$.

Figure 2:
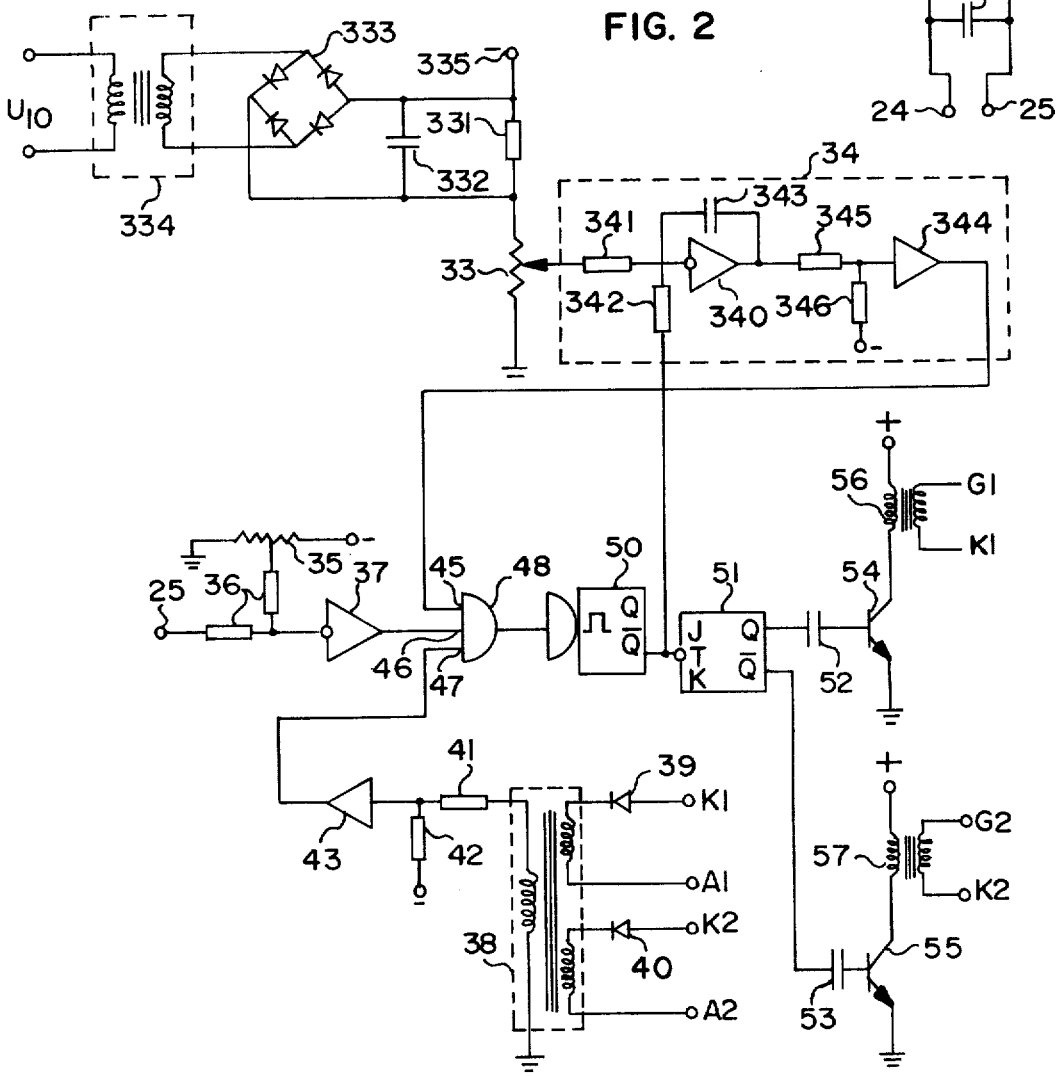
FIG. 2 is a circuit diagram of a control circuit intended for use with the current supply unit of FIG. 1.

In FIG. 2, there is shown a control device which is adapted to control the frequency converter in a manner such that the arc power remains substantially constant irrespective of changes in load caused by the welding operation and by changes in input voltage. This control device includes a potentiometer 33 and an oscillator 34, said potentiometer being adapted to control the operating frequency of the oscillator 34. The potentiometer 33 is connected between earth and a negative voltage source which varies substantially inversely proportional to the square of the voltage applied to the frequency converter.

In the shown embodiment, the control device further includes a fixed negative potential 335 and a load resistor 331 connected in series with the potentiometer 33. The supply voltage $U_{10}$ is applied to the primary of a transformer 334 the secondary of which is connected through a bridge rectifier 333 to a smoothing capacitor 332 and said load resistor 331. The values of the components are chosen so that the voltage across the resistor 331 is approximately twice that of the voltage across the power adjusting device 33. The voltage across the resistor 331 will therefore vary in proportion in $U_{10}$ which in turn means that the voltage across the power adjusting device 33 will vary approximately in proportion to $1/U_{10}^2$ as long as the variations of the supply voltage are small, e.g. not more than $\pm 5\%$. The frequency of the oscillator 34 controlled by the voltage adjusting device 33 will thus also vary in proportion to $1/U_{10}^2$. Instead of using $U_{10}$ as the control voltage signal, it is of course possible to use the voltage applied to the converter capacitor 19,20.

The oscillator 34 includes an integrating circuit comprising an amplifier 340, resistors 341 and 342, and a capacitor 343. The oscillator also includes a level discriminator 344 with associated comparison resistors 345, 346, the resistor 345 being connected to the output of the integrating circuit and the resistor 346 being connected to a voltage source having a fixed negative voltage. The amplifier 340 is controlled in the positive sense by control signals from the potentiometer 33 and in the negative sense by signals from the Q-output of a monostable flip-flop 50 hereinafter described. A voltage adjuster 35 in the form of a potentiometer is provided for adjusting the desired maximum output voltage from the current supply unit, which voltage adjuster 35 is connected via comparison resistors 36 to the teminal 25 of the current supply unit and to an amplifier 37 which serves as a level discriminator.

Control of the state of the thyristors 15, 16 is effected by means of a sensing circuit comprising a transformer 38, the primary side of which is connected via diodes 39, 40 to the anodes $A_1$, $A_2$ and cathodes $K_1$, $K_2$ of the thyristors 15, 16. One end of the secondary winding of the transformer 38 is earthed and the other end is connected to a comparison circuit which comprises two resistors 41, 42, the resistor 42 having one end thereof connected to a constant negative voltage. The junction between the resistors 41, 42 is further connected to an amplifier 43 which serves as a level discriminator and the change-over point of which is determined by the resistors 41, 42 and the aforementioned constant negative voltage. Each of the amplifiers 344, 37 and 43 is connected to a respective input 45, 46, 47 of an AND gate 48, which operates in a known manner. Thus, in order for the AND gate 48 to emit an output signal, it is necessary for the output signal obtained from the amplifier 344 to be positive. Correspondingly, it is necessary for the output signal from the amplifier 37 to be positive, i.e. for the load voltage on the terminal 25 to be less than the value for which the adjuster 35 is set. Finally, the output signal from the amplifier 43 must be positive, which means that the anode voltage of one of the thyristors 15 or 16 is negative in relation to the cathode, which in turn means that both the thyristors 15 and 16 are de-energized.

The output of the AND gate 43 is connected to the input of the monostable flip-flop 50 which has a predetermined pulse period corresponding to the recovery time of the thyristors 15, 16, for example 30 μus. Thus, on the output Q of the flip-flop 50 there is obtained a positive voltage pulse for a period of time corresponding to the recovery time of the thyristors 15, 16. This pulse is transmitted through the resistor 342 to the amplifier 340 and is also transmitted to the trigger input T of a JK flip-flop 51, so that the JK flip-flop 51 changes the status of its outputs at the end of the pulse obtained from the flip-flop 50. The outputs Q, Q of the JK flip-flop 51 are connected to the base electrodes of respective transistors 54, 55 via capacitors 52, 53. The emitters of the transistors 54, 55 are connected to earth while their collectors are connected to the primary windings of respective ignition transformers 56, 57 for the thyristors 15, 16. The other ends of the primary windings are connected to a terminal having a pre-determined positive potential, and the ends of the secondary windings are connected to the cathode $K_1$ or $K_2$ and the gate $G_1$ or $G_2$ of a respective thyristor 15 or 16. The signals from the outputs of the JK flip-flop 51 will alternatively render the transistors 54, 55 conductive via the capacitors 52, 53, for a short period of time determined by the capacitors 52, 53, so that the thyristors 15, 16 alternately receive a short ignition pulse and thereby alternately supply current to the primary winding 18 of the transformer 17 to produce an alternating current whose frequency is determined by the signals on the inputs 45, 46, 47 of the AND gate 48. With this arrangement a desired substantially constant arc power can be set solely by a corresponding adjustment of the potentiometer 33.

Figure 3:
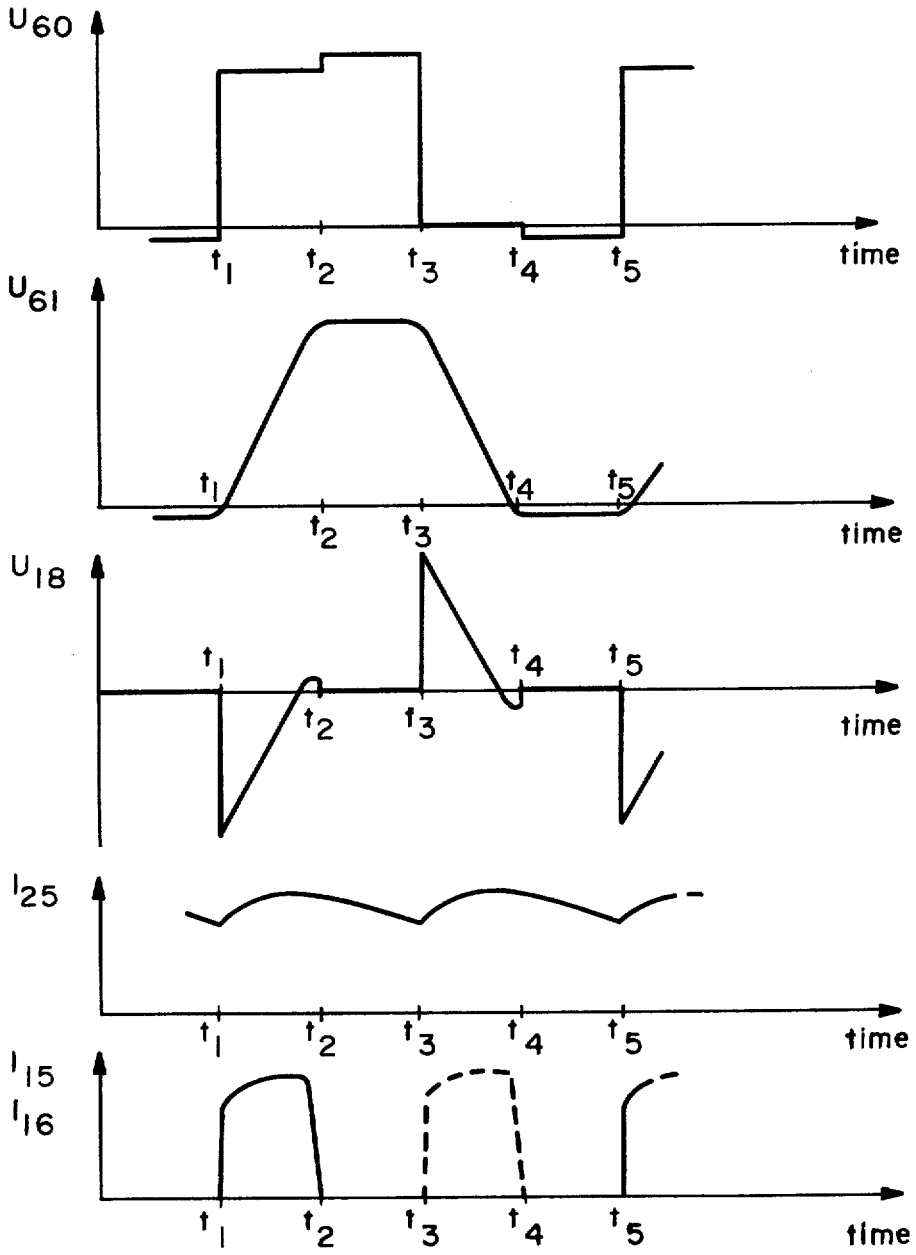
FIG. 3 illustrates curves denoting voltages and currents which occur during the normal operation of the current supply unit.

FIG. 3 shows the voltages $U_{60}$, $U_{61}$ at points 60, 61 and the voltage $U_{18}$ across the primary winding 18 of the transformer 17 with normal load on the output of the current supply unit shown in FIGS. 1 and 2. FIG. 3 also shows the output current $I_{25}$ through the terminal 25 and the output currents $I_{15}$ and $I_{16}$ (the latter shown in dash lines) from the thyristors 15, 16. In FIG. 3 the reference $t_1$ illustrates the point of time when the thyristor 15 is ignited, $t_2$ the point of time when the thyristor 15 is ignited, $t_2$ the point of time when the thyristor 15 is de-energized and obtains a negative voltage between the anode $A_1$ and cathode $K_1$ as a result of the resonant circuit formed by the primary winding 18 of the transformer 17 and the capacitors 19, 20, $t_3$ the point of time when the thyristor 16 is ignited, and $t_4$ the point of time when the thyristor 16 is de-enegized and obtains a negative anode voltage as a result of said resonant circuit 18, 19, 20. The reference $t_5$ shows the point of time at which the thyristor 15 is re-ignited, whereupon the sequence is repeated provided that the load remains substantially unchanged. *When thyristor 15 is turned on it provides a charging path for capacitor 20 and a discharge path for capacitor 19. When thyristor 16 is turned on and thyristor 15 is off, a charging path is provided for capacitor 19 and a discharge path is provided for capacitor 20. Each capacitor is alternately charged and discharged through the switching thyristors and the primary winding 18.*

The invention is not limited to the frequency converter illustrated and described, but may be used in conjunction with other frequency converters, for example frequency converters having forced commutation or d.c. controlled intermediate stages. If larger fluctuations in supply voltage $U_{10}$ than e.g. ±5% are likely to occur, there may be added to the varying negative voltage source described with reference to FIG. 2 a multiplying circuit which generates across the resistor 331 a voltage which is truly proportional to $1/U_{10}^2$.

I claim:

1. An arc welding current supply unit arranged to be fed with alternating current voltage and to provide direct current for welding electrodes, said unit including a controlled frequency converter operating with a half period which is less than the average duration of the current and voltage transients caused by short circuits through droplets of the weld material and adapted to be connected to the welding electrodes through a transformer in series with a rectifier, a control device for controlling said converter in a manner such that the arc power remains substantially unchanged irrespective of changes in load caused by the welding operation, wherein current pulses are formed in the secondary winding of the transformer by alternatingly charging and discharging at least one capacitor which is connected in series with said primary winding of said transformer and which is discharged therethrough, and said at least one capacitor being charged by a direct current voltage intermediate source and being connected to said source by a number of thyristors equal in number to the number of said capacitors, said thyristors being connected to said control device, and wherein said control device further comprises means for alternatingly making said thyristors conductive at a frequency which is substantially inversely proportional to the square of said voltage applied to said current supply unit.

*2. An arc welding current supply unit arranged to be fed with alternating current voltage and to provide direct current for welding electrodes, said unit including a controlled frequency converter operating with a half period which is less than the average duration of the current and voltage transients caused by short circuits through droplets of the weld material and adapted to be connected to the welding electrodes through a transformer, a control device for controlling said converter in a manner such that the arc power remains substantially unchanged irrespective of changes in load caused by the welding operation, wherein current pulses are formed in the secondary winding of the transformer by alternatingly charging and discharging at least one capacitor which is connected in series with said primary winding of said transformer and which is discharged therethrough, a direct current voltage intermediate source, and switching means responsive to said control device for connecting said at least one capacitor to said intermediate source for charging and discharging said capacitor; and wherein said control device further comprises means for controlling said switching means to altenatingly charge and discharge said at least one capacitor at a frequency which is substantially inversely proportional to the square of said voltage applied to said current supply unit.*

*3. An arc welding current supply unit as claimed in claim 2 further comprising a rectifier connected between said transformer and said welding electrodes.*

*4. An arc welding current supply unit as claimed in claim 3 wherein said control device comprises,*

*a voltage controlled oscillator for providing a pulse train output at a rate dependent upon a voltage input thereto, said pulse train output determining the frequency of switching of said switching means, and*

*means connected between said input alternating current voltage and said oscillator for supplying to said oscillator a voltage input substantially inversely proportional to the square of the voltage applied to said current supply unit.*

*5. An arc welding current supply unit as claimed in claim 4 wherein said switching means comprises first and second thyristors and wherein said control device further comprises,*

*thyristor ignition circuitry for altenately igniting said thyristors into their conducting states in response to triggering pulses applied thereto, and*

*gating means connected to said voltage controlled oscillator and said thyristor ignition circuitry for applying pulses in said pulse train output to said thyristor ignition circuitry as said triggering pulses when said gating means is not otherwise blocked.*

*6. An arc welding current supply unit as claimed in claim 5 wherein said control device means further comprises, a first blocking means connected between said thyristors and said gating means for blocking said gating means at all times other than when a reverse bias appears across the anode cathode path of either of said thyristors, whereby neither thyristor can be turned on until the previously conducting thyristor is turned off.*

*7. An arc welding current supply unit as claimed in claim 6 wherein said control device means further comprises, a second blocking means for blocking said gating means when the voltage to said welding electrodes exceeds a predetermined maximum.*

*8. An arc welding current supply unit as claimed in any of claims 5, 6, or 7 further comprising first and second capacitors alternately charged and discharged through said primary winding by the alternate conduction of the second and first of said two thyristors, wherein said first and second thyristors are in series with one another and connected across said d.c. voltage intermediate source, said one and second capacitors are in series with one another and connected across said d.c. voltage intermediate source, and said primary winding is connected between the junction of said first and second thyristors and the junction of said one and second capacitors.*

*9. An arc welding current supply unit as claimed in claim 2 wherein said switching means comprises first and second thyristors and wherein said at least one capacitor comprises first and second capacitors, said thyristors, capacitors and primary winding being connected such that said first capacitor is charged via said second thyristor and said primary winding and is discharged via said first thyristor and primary winding, and wherein said second capacitor is charged through said first thyristor and primary winding and is discharged through said second thyristor and primary winding.*

*10. An arc welding current supply unit as claimed in any of claims 2, 3 or 4 wherein said switching means comprises first and second thyristors and wherein said at least one capacitor comprises first and second capacitors, said first and second capacitors being alternately charged and discharged through said primary winding by the alternate conduction of the second and first of said two thyristors, wherein said first and second thyristors are in series with one another and connected across said d.c. voltage intermediate source, said one and second capacitors are in series with one another and connected across said d.c. voltage intermediate source, and said primary winding is connected between the junction of said first and second thyristors and the junction of said one and second capacitors.*

* * * * *